INVENTOR:
ROBERT M. RINDER
BY Peter P. Tailer
ATTORNEY

INVENTOR:
ROBERT M. RINDER
BY Peter P. Tailer
ATTORNEY

Sept. 3, 1968 R. M. RINDER 3,399,475

DIGITAL INDICATOR

Filed Jan. 19, 1968 4 Sheets-Sheet 3

INVENTOR:
ROBERT M. RINDER

BY Peter L. Tailer
ATTORNEY

INVENTOR:
ROBERT M. RINDER
BY Peter P. Tailer
ATTORNEY

United States Patent Office 3,399,475

Patented Sept. 3, 1968

3,399,475

DIGITAL INDICATOR

Robert M. Rinder, 425 E. 12th St., New York, N.Y. 10009

Continuation-in-part of application Ser. No. 589,413, Oct. 25, 1966. This application Jan. 19, 1968, Ser. No. 699,210

10 Claims. (Cl. 40—28)

ABSTRACT OF THE DISCLOSURE

A fixed cover plate and four movable slides contain apertures so that a small movement of one or more of the slides will align apertures to allow light to pass therethrough and indicate digits from 0 to 9. The digits are indicated in a conventional manner in seven areas which form parts of the digits. The apertures in the cover and the slides are of equal width and aligned in the direction of movement of the slides. To pass a maximum amount of light, the apertures may extend completely across the areas in which parts of digits are indicated.

*Cross reference to related application*

This application is a continuation-in-part of my presently pending patent application Ser. No. 589,413, filed on Oct. 25, 1966, now abandoned, and entitled, Digital Indicator.

*Background of the invention (field of the invention)*

This invention relates in general to devices which display a given digit in response to an input; and, more particularly, to a digital indicator which decodes standard inputs to display a given digit.

Digital indicators conventionally display digits from 0 to 9 in response to electrical or other signals in the following manner. When no signals are applied to an indicator station, it would display a 0. An input signal applied to each of four inputs of a digital indicator station would cause it to display, respectively, the digits 1, 2, 4, and 8. Signals applied to inputs one and two of a digital display station would cause it to indicate the digit 3, to inputs two and four the digit 6, to inputs one and four the digit 5, to inputs one, two, and four the digit 7, and to inputs one and eight the digit 9. Thus signals applied to any one of or combinations of inputs of a digital display station may cause it to indicate digits from 0–9 in response thereto.

*Description of the prior art*

Some digital display devices have a plurality of light sources at each display station so that the light sources may be selectively activated to illuminate elongated windows to form a recognizable digit. Such display devices require decoding circuits to have signals from the conventional four inputs light suitable light sources at each display station. Other digital display devices use neon lights formed to represent digits or they use lights having filaments formed to represent digits. These require high voltages, are expensive, and have other disadvantages.

U.S. Patent No, 3,054,203 discloses a device which may be used for digital display, the device having four moving slides as does that of this invention. However, the light passing areas which indicate a portion of a digit as disclosed in this patent are divided into sixteen aperture locations which must be disposed in a matrix of four possible aperture locations in four rows. Thus the maximum possible amount of light that can be passed through a given light passing area to indicate a portion of a digit can, at most, pass through one sixteenth of the light passing area. The light passing areas of the instant invention may pass light through up to one quarter of each of its light passing areas. The large portion of each area which may be used to pass light to indicate a portion of a digit in the instant invention allows it to be effective even when using reflected light which is not suggested in the above patent.

*Summary of the invention*

An indicating station for indicating digits from 0 to 9 has four slides, each of which are movable from a first to a second position. The four slides are disposed behind a cover over a light source or over a light reflecting surface. The slides and the cover contain sets of apertures of the same width aligned in the direction in which said slides are movable, so that movement of one or more of the slides superimposes apertures to pass light therethrough and indicate a portion of a digit. If desired, the width of the aperture may extend substantially across the area in which they indicate a portion of a digit. This permits the device of this invention to more brightly indicate digits with a given light source.

A main object of this invention is to provide a less expensive and more reliable digital indicator.

Another object of this invention is to provide a more simple and efficient digital indicating device which indicates digits from 0 to 9 directly in response to combinations of signals from four input sources.

A further object of this invention is to provide a digital indicator which will function using only reflected light.

Yet another object of this invention is to provide an indicating station for displaying digits from 0 to 9 which will function with only a single light source.

Still another object of this invention is to provide a digital indicator having four moving slide elements, a slight displacement of the first slide element indicating the digit 1, of the second slide the digit 2, of the third slide the digit 4, of the fourth slide the digit 8, of the first and second slides the digit 3, of the first and fourth slides the digit 9, of the first and third slides the digit 5, of the second and third slides the digit 6, of the first, second, and third slides the digit 7, and with no displacement of any slides indicating the digit 9.

An additional object of this invention is to provide a digital indicator which is compatible with existing systems.

Many other objects, advantages, and features of invention reside in the particular construction, combination, and arrangement of parts involved in the embodiments of this invention and its practice.

*Description of the preferred embodiments*

Figure 1:
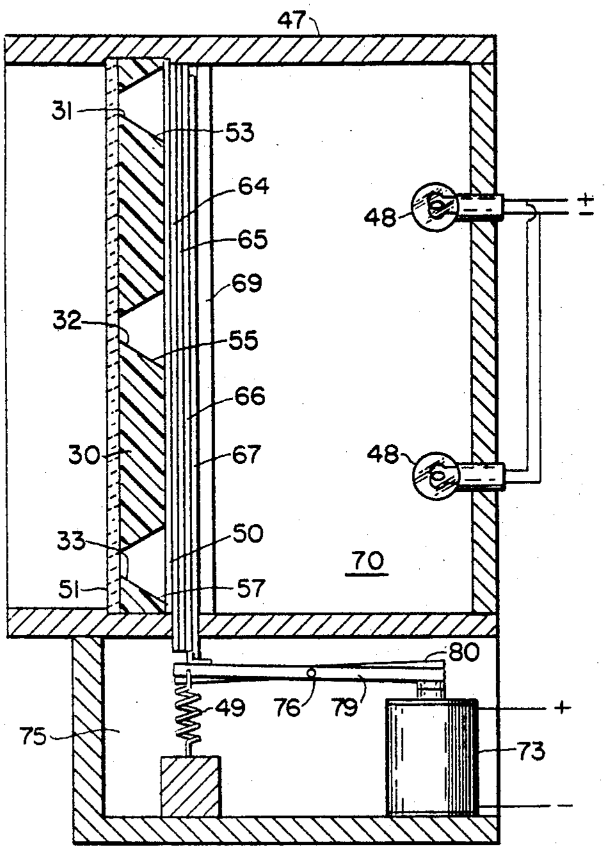
FIGURE 1 is a transverse vertical section taken through a digital display device according to a first embodiment of my invention with the movable slides not shown in section, the section being taken on line 1—1 of FIGURE 2.
Figure 2:
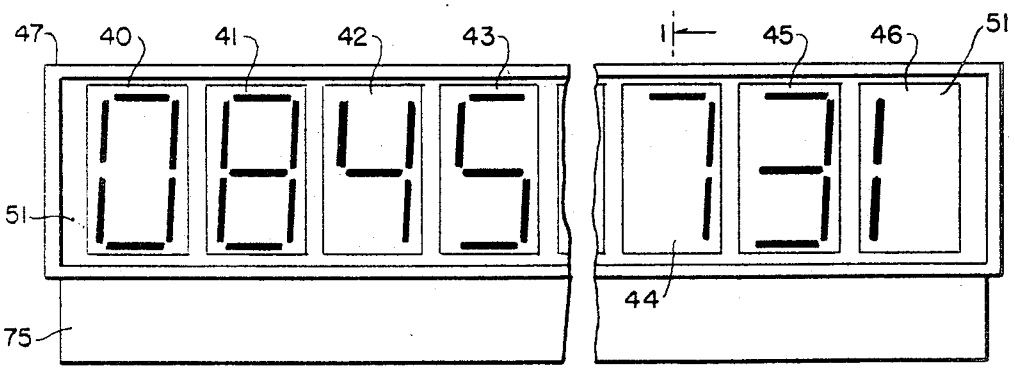
FIGURE 2 is a front view of a digital display device having a number of display stations at each of which a digit is displayed, the digital display device having a center portion broken away.

Referring to the drawing in detail, the first embodiment of this invention is shown in FIGURES 1–19. As may be seen in FIGURE 4, a window containing plate 30 of an indicating station for digits has three horizontal windows 31, 32, and 33 formed in it and has four substantially vertical windows 34, 35, 36 and 37 also formed in it. As shown in FIGURE 2, an indicating station 40 has its windows 31, 33, 34, 35, 36 and 37 illuminated to indicate the digit 0. Indicating station 46 has its windows 34 and 35 illuminated to indicate the digit 1. Indicating stations 41, 42, 43, 44 and 45, respectively, have their windows 31, 32, 33, 34, 35, 36 and 37, windows 32, 43, 36 and 37, windows 31, 32, 33, 34 and 37, windows 31, 36 and 37, and windows 31, 32, 33, 36 and 37 illuminated to indicate or display the digits 8, 4, 5, 7 and 3, as shown. In a like manner, an indicating station could indicate digits 2, 6 and 9 by illuminating the windows 31, 32, 33, 35 and 36, the windows 31, 32, 33, 34, 35 and 37, and the windows 31, 32, 33, 34, 36 and 37, respectively.

Thus it may be seen that a number of digit indicating stations located side by side in a suitable case 47 containing bulbs 48, or any other suitable light source, can indicate any desired number. The essence of this invention involves a new and novel way of illuminating or passing light to the windows of a digit indicating station. Since this invention passes light from the bulbs 48 through the windows 31–37, one bulb 48 can fail and still leave the indicating station operative. The conventional digital indicator which requires a bulb behind each window must make use of many bulbs and the failure of a bulb can indicate an incorrect digit. In addition, decoding circuits are required to illuminate appropriate bulbs in response to the conventional four input signals. These disadvantages are circumvented by the first embodiment of my invention.

This first embodiment of my invention illuminates appropriate windows of each digital indicating station by moving or not moving four slides. As shown in FIGURE 1, each indicating station has a fixed slide 50 secured in the case 47. A window plate 30 is fixed in front of the slide 50. A ground glass 51 extends in front of all the window plates 50 to pick up and clearly show light passing through windows 31–37.

Figure 4:
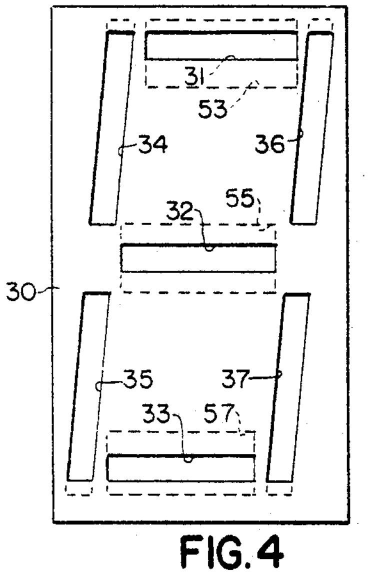
FIGURE 4 is a front view of a window containing plate of a digital display station of the first embodiment of this invention.
Figure 5:
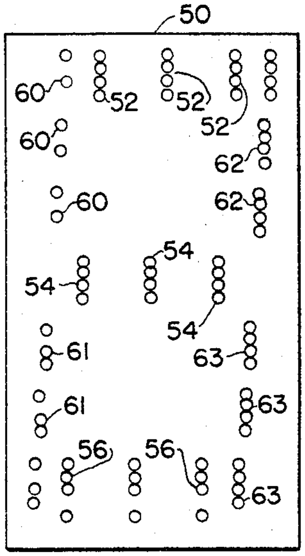
FIGURE 5 is a front view of a stationary front slide of the first embodiment of this invention.
Figure 6:
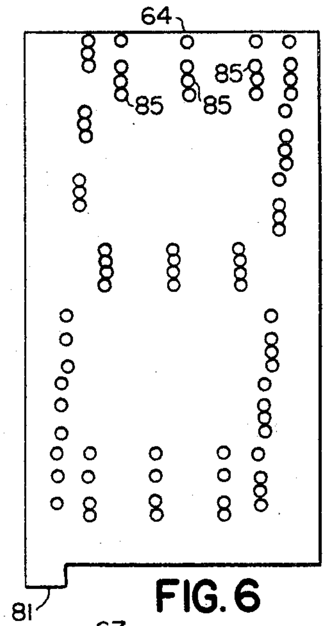
FIGURES 6, 7, 8 and 9 are front views, respectively, of first, second, third, and fourth movable slides of the first embodiment of this invention.
Figure 7:
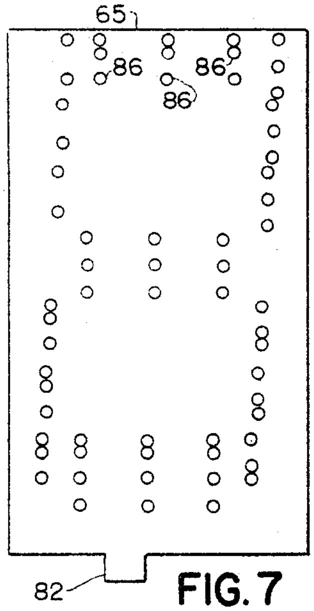
Figure 8:
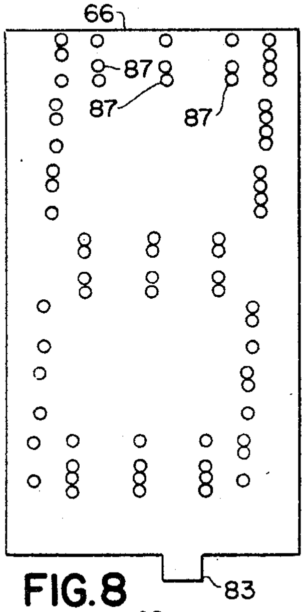
Figure 9:
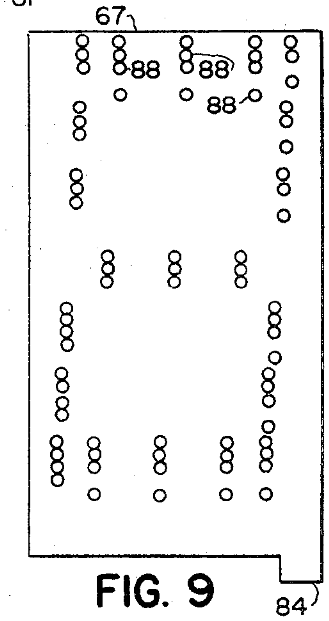

Referring now to FIGURES 1, 4 and 5, sets of apertures 52 extend behind the wider rear portion 53 of each window 31. In a like manner additional sets of apertures are formed in the fixed slide 50 to form the sets of apertures 54 and 56 which extend, respectively, behind the wider rear portions 55 and 57 of the windows 32 and 33. The sets of apertures 60, 61, 62 and 63 are formed in fixed slide 50 to extend behind the substantially vertically disposed windows 34, 35, 36 and 37, respectively. Thus, as shown, the fixed slide 50 contains three sets of apertures disposed behind each of the windows 31–37 of the window plate 50.

Figure 3:
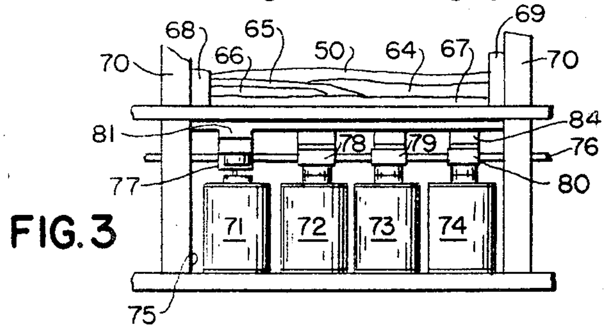
FIGURE 3 is a rear view of a lower fragment of a digital display station according to a first embodiment of this invention.

Referring further to FIGURES 1 and 3, four slides 64, 65, 66 and 67 are constrained to move vertically behind the fixed slide 50 by means of the vertical guide strips 68 and 69. Partition walls 70 may be provided between each indicator station. Four electromagnets 71, 72, 73 and 74 are fixed within the hollow base 75 below each indicating station. A horizontal wire 76 pivotally mounts four arms 77, 78, 79 and 80. The front end of each arm 77, 78, 79 and 80 is connected, respectively, to a movable slide 64, 65, 66 and 67 by means of the tabs 81, 82, 83 and 84. The front ends of the arms 77, 78, 79 and 80 are also connected to the tension springs 49 which urge the front ends of the arms and thus the movable slides 64, 65, 66 and 67 downward. Thus it may be seen that the energizing of an electromagnet 71, 72, 73 or 74 will move a connected slide 64, 65, 66 or 67 upward as the energized electromagnet attracts the rear end of an arm 77, 78, 79 or 80 downward. The springs 49 return the movable slides 64, 65, 66 and 67 downward when the magnets 71, 72, 73 and 74 are de-energized.

As shown in FIGURES 5–9, the fixed slide 50 and the movable slides 64, 65, 66 and 67 each contain perforations and unperforated spaces in overlying sets of three repeating patterns on each slide disposed to lie behind the windows 31, 32, 33, 34, 35, 36 and 37. The perforations in each set are vertically disposed or have a space between them exactly equal to the vertical distance the movable slides 64, 65, 66 and 67 may be moved.

Figure 10:
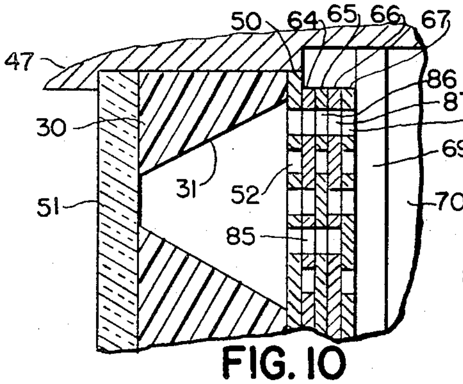
FIGURE 10 is a vertical, transverse section through a fragment of a ground glass, a window plate, a stationary front slide, four movable slides, and a case of the digital display device of the first embodiments of this invention with the display device indicating the digit 0.

FIGURE 10 shows the fixed slide 50 and the movable slides 64, 65, 66 and 67 disposed behind window 31. All the slides 64, 65, 66 and 67 are in their lowermost positions as no signals are activating the electromagnets 71, 72, 73 and 74. As may be seen in FIGURES 6, 7, 8 and 9, sets of apertures 85, 86, 87 and 88 are formed, respectively, in the slides 64, 65, 66 and 67 behind the three sets of apertures 52 in fixed slide 50. Thus, when none of the slides 64, 65, 66 and 67 are moved, the uppermost apertures in each set 52, 85, 86, 87 and 88 are aligned as shown in FIGURE 10 to pass light therethrough. This light, passing through the aligned uppermost apertures of the three sets of apertures 52, 85, 86, 87 and 88, illuminates window 31 as required to indicate the digit 0. It is to be noted that if one bulb 48 fails, the other bulb 48 will provide sufficient light to indicate a digit.

Figures 11, 12, 13, 14:
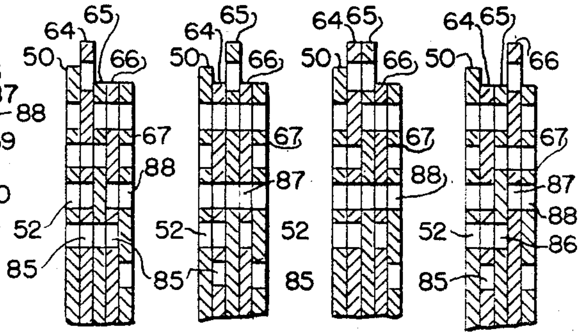
FIGURES 11, 12, 13, 14, 15, 16, 17, 18 and 19 are transverse vertical sections through fragments of the upper portions of the stationary and movable slides of the first embodiment of this invention with the slides positioned to indicate the digits 1, 2, 3, 4, 5, 6, 7, 8 and 9, respectively.

FIGURE 11 shows the slide 64 moved upward to indicate the digit 1. Slide 64 now blocks the formerly aligned uppermost apertures of the sets 52, 85, 86, 87 and 88 so that window 31 is not illuminated. It is to be noted that the window 31 should not be illuminated to indicate the digit 1.

FIGURE 12 shows only the slide 65 moved upward to indicate the digit 2. The second from the top aperture in the set 86 and the uppermost apertures of sets 52, 85, 87 and 88 are now aligned to pass light to window 31 as required to indicate the digit 2.

FIGURE 13 shows both slides 64 and 65 raised to indicate the digit 3 which requires that window 31 be illuminated. This light passes through the third aperture from the top of the set 52 and the aligned apertures of the sets 85, 86, 87 and 88 behind it.

Figures 15, 16, 17, 18, 19:
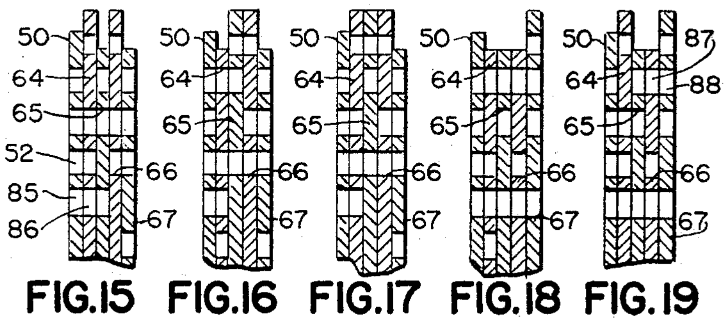

FIGURE 14 shows slide 66 raised to block light to window 31 to indicate the digit 4; FIGURE 15 shows both slides 64 and 66 raised to pass light to window 31 while indicating the digit 5; FIGURE 16 shows the slides 65 and 66 raised to pass light to window 31 while indicating the digit 6; FIGURE 17 shows the three slides 64, 65 and 66 raised to indicate the digit 7; FIGURE 18 shows the slide 67 raised to pass light to window 31 while indicating the digit 8; and FIGURE 19 shows the slides 64 and 67 raised passing light to window 31 while indicating the digit 9.

In a like manner, sets of apertures in the slides 64, 65, 66 and 67 disposed behind the sets of apertures 54, 56, 60, 61, 62 and 63 in the fixed slide 50 appropriately pass or block light to windows 32, 33, 34, 35, 36 and 37 while indicating digits 0 to 9.

It is to be noted that this first embodiment of my invention requires only four input signals to indicate all digits from 0 to 9, and no decoding circuits are required. While three sets of perforations are shown formed in each slide behind each window, any number of sets of perforations could be used. As will be described, one set of perforations may be made in each slide for each window and the perforations may be made in the form of slits to pass more light. While perforations have been described, transparent areas or windows may be provided. In one model made, photographic film with opaque and transparent areas was used for the slides 50, 64, 65, 66 and 67. Thus the term perforation or aperture is intended to include any light passing area.

The second embodiment of my invention is shown using reflected light, although this embodiment could also use light passing from a light source to indicate digits. FIGURES 20, 21, 22 and 23 shows a single digit indicating station having a mounting board 100 above which there is positioned a spaced distance away a fixed slide 101. Movable slides 102, 103, 104 and 105 are slidably mounted below fixed slide 101. Upper corner projections 107 of the movable slides 102, 103, 104 and 105 are slidably secured in the guide 108.

By means of four electromagnets 110, 111, 112 and 113, and the centrally pivotally mounted arms 114, 115, 116 and 117, the slides 102, 103, 104 and 105 may be moved selectively upward and to the left as shown. Each slide 102, 103, 104 and 105 is connected to the right hand end of an arm 114, 115, 116 and 117 and each slide 102, 103, 104 and 105 is urged downward and to the right as shown by means of a spring 118.

Figures 20, 21, 22, 23:
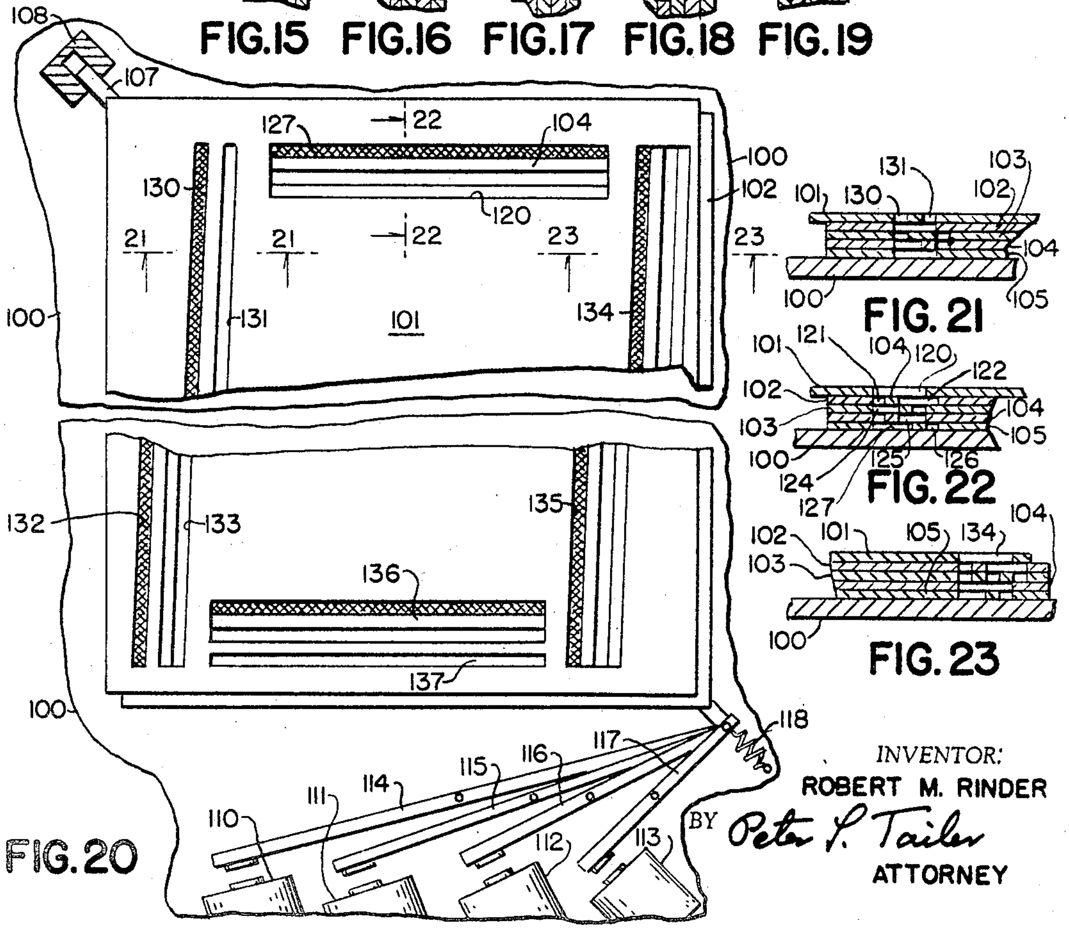
FIGURE 20 is a front view of upper and lower fragments with a center portion broken away of a display station of a second embodiment of my invention using reflected light.
FIGURES 21, 22 and 23 are sections taken on lines 21—21, 22—22 and 23—23, respectively, of FIGURE 20.

Fixed slide 101 contains a wide slit 120 as shown in FIGURES 20 and 22 which forms a window 120 corresponding in location to the window 31 of the first embodiment of this invention. The uppermost slide 102 contains slits 121 and 122 in the same pattern as the set of apertures 85 in slide 60 shown in FIGURE 6. Slide 60 has the set of apertures 85 arranged with an upper aperture, a space, and three adjacent lower apertures. Thus the corresponding slide 102, as shown in FIGURES 20 and 22, contains a slit 121, a space 124 as wide as slit 121, and a slit 122 three times as wide as slit 121. Slides 103, 104 and 105, as also shown in FIGURE 22, contain slits 124, 125 and 126 in patterns corresponding to the apertures in the sets of apertures 86, 87 and 88 in the slides 65, 66 and 67 shown in FIGURES 7, 8 and 9. Thus, as shown in FIGURES 20 and 22, with none of the slides 102, 103, 104 or 105 moved, light passes through the upper portion of window 120 and the upper slits 121, 124, 125 and 126 to render visible the mounting board 100 which is colored black, any other contrasting color, or with a reflecting surface in portions 127 which underlie windows.

In the same manner which has been described, slits 130 and 131 form a window corresponding to window 34 of the first embodiment of my invention, slits 132 and 133 form a window corresponding to window 35, slit 134 forms a window corresponding to window 36, slit 135 forms a window corresponding to window 37, and slits 136 and 137 form a window corresponding to window 33.

In the first embodiment of my invention, the pattern of the sets of apertures in the slides 64, 65, 66 and 67 forming the sets of apertures behind the sets of apertures 60 and 62 of fixed slide 50 is arranged from top to bottom. The pattern of the sets of apertures is vertical from top to bottom as the slides 64, 65, 66 and 67 move vertically upward. In the second embodiment of this invention, slides 102, 103, 104 and 105 move obliquely upward and to the left as shown in FIGURE 20. For this reason, the substantially vertical slits forming windows are arranged in patterns from left to right corresponding to the patterns of the apertures shown for the first embodiment of this invention. Just as the vertical movement of the slides 64, 65, 66 and 67 of the first embodiment is equal to the distance between the centers of adjacent spaces, adjacent apertures, or an adjacent space and aperture, the oblique movement of the slides 102, 103, 104 and 105 is upward for a distance equal to the width of the narrowest horizontal slits and to the left a distance equal to the width of the narrowest substantially vertical slits.

As shown in FIGURES 20, 21, 22 and 23, color 127 shows through slits 120, 130, 132, 134, 135 and 137 when no slides 102, 103, 104 and 105 are moved to indicate the digit 0. In a manner similar to the first embodiment of my invention, movement of slide 102 indicates the digit 1, slide 103 the digit 2, slides 102 and 103 the digit 3, slide 104 the digit 4, slides 104 and 102 the digit 5, slides 103 and 104 the digit 6, slides 102, 103 and 104 the digit 7, slide 105 the digit 8, and slides 102 and 105 the digit 9.

As has been stated, while the second embodiment of this invention has been shown and described using reflected light, it could easily be adapted to pass the light from a light source to indicate digits. While a given geometry or pattern of apertures and slits have been shown to pass light through the slits or windows of the first and second embodiments of this invention, other patterns or geometries may be used. The pattern shown for the sets of apertures in FIGURE 5–19 is merely an example of one operative pattern.

Figure 24:
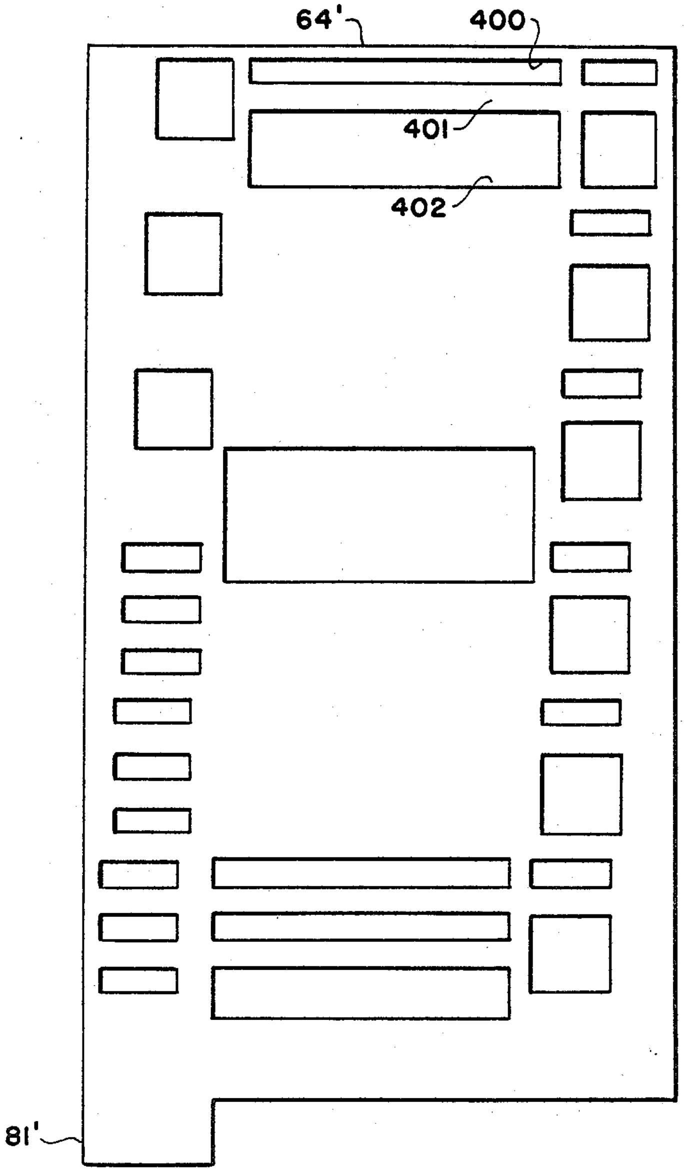
FIGURE 24 is a front view of a slide similar to that shown in FIGURE 6 modified according to a third embodiment of this invention.

FIGURE 24 shows a third embodiment of this invention which is similar to the first embodiment in every way except that the apertures in its fixed slide and its movable slides are slits extending completely across the windows of the window containing plate 30. FIGURE 24 shows a slide 64' which similar to slide 64 of FIGURE 6 except that the set of apertures 85 of slide 64 are formed as a single width slit 400 below which there is a single width space 401 followed by a triple width slit 402. Each of the other sets of apertures in slide 64' is formed by equivalent sets of horizontal slits. This third embodiment of my invention passes a maximum amount of light through the windows of plate 30 to more brightly indicate a digit.

All embodiments of this invention could be used to display a computer output in numerical form. Other uses could be to indicate ramp numbers for incoming or departing planes, as a part of a display to indicate the time or the temperature, the remote reading of information such as the weights recorded by truck weighing platforms, etc.

While one particular form has been shown for each embodiment of this invention, it could take many other forms. For example, the movable slides could selectively pass light which would be piped or conducted in Lucite tubes to remotely situated viewing windows.

While I have disclosed my invention in the best forms known to me, these are purely exemplary and modifications may be made without department from the spirit and scope of the invention.

What is claimed is:

1. A digital indicator comprising, in combination, at least one indicating station indicating digits from 0 to 9 in response to four input signals and combinations thereof, said at least one indicating station having a fixed slide and four movable slides disposed one behind the other, and means moving one of said movable slides in response to each input signal from a first to a second position, said slides containing overlying sets of apertures of the same width and aligned in the direction of motion of said movable slides, some of apertures in said sets of apertures having spaces therebetween forming patterns of apertures, movement of a single movable slide and of combinations thereof from first to second positions aligning overlying apertures of at least some of the overlying patterns of apertures to pass light therethrough and indicate portions of digits.

2. The combination according to claim 1 with the addition of a display surface containing areas within which portion of digits are indicated by light passing through overlying aligned apertures in said slides, the apertures in said slides extending substantially across the areas within which portions of digits are indicated.

3. The combination according to claim 1 wherein said display surface comprises a window plate, said window plate containing upper, central, and lower horizontal windows, right and left upper substantially vertical windows, and right and left lower substantially vertical windows, light passing through aligned overlying apertures of said slides indicating digits from 0 to 9 in said windows.

4. The combination according to claim 3 wherein said apertures in said slides behind said horizontal windows extend horizontally substantially across said horizontal windows and said apertures in said slides behind said vertical windows extend vertically substantially across said vertical windows, said movable slides moving obliquely in a direction between the angles of said horizontal and vertical windows.

5. The combination according to claim 1 with the addition of a light source in said digital indicator, light from said light source passing through aligned overlying apertures of said slides indicating digits.

6. The combination according to claim 1 wherein said means moving said movable slides comprises an electromagnet for each movable slide and a magnetic element connected to each movable slide, each magnetic element being attracted on activation of one of said electromagnets moving a movable slide, said input signals each activating one of said electromagnets.

7. The combination according to claim 3 wherein said four movable slides are first, second, third and fourth movable slides, the movable slides being in said first positions to indicate the digit 0, the first movable slide being moved to said second position to indicate the digit 1, the second movable slide being moved to said second position to indicate the digit 2, the third movable slide being moved to said second position to indicate the digit 4, the fourth movable slide being moved to said second position to indicate the digit 8, the first and second movable slides being moved to said second positions to indicate the digit 3, the first and third movable slides being moved to said second positions to indicate the digit 5, the second and third movable slides being moved to said second positions to indicate the digit 6, the first, second, and third movable slides being moved to said second positions to indicate the digit 7, and the third and fourth movable slides being moved to said second positions to indicate the digit 9.

8. The combination according to claim 7 wherein behind said upper horizontal window said fixed slide contains at least one set of four adjacent apertures, said first movable slide contains at least one set of an upper aperture, a space, and three adjacent apertures, said second movable slide contains at least one set of two adjacent upper apertures, a space, and a lower aperture, said third movable slide contains at least one set of an upper aperture, a space, and two adjacent lower apertures, and said fourth movable slide contains at least one set of three adjacent upper apertures, a space and a lower aperture.

9. The combination according to claim 7 wherein behind said central horizontal window said fixed slide and said first, second, third, and fourth movable slides each contain, respectively, at least one set of: four adjacent apertures; an upper aperture, a first space, a central aperture, a second space, and a lower aperture; two adjacent upper apertures, a space, and two adjacent lower apertures; and three adjacent apertures; and wherein behind said lower horizontal window said fixed slide and said first, second, third, and fourth movable slides each contain, respectively, at least one set of: three adjacent upper apertures, a space, and a lower aperture; an upper aperture, a first space, a central aperture, a second space, and two adjacent lower apertures; two adjacent upper apertures, a first space, a central aperture, a second space, and a lower aperture; an upper aperture, a space, and three adjacent lower apertures; and three adjacent upper apertures, a space, and a lower aperture.

10. The combination according to claim 7 wherein said fixed slide and said first, second, third, and fourth movable slides each contain, respectively, in the direction of motion of said movable slides from said second position to said first position behind said right upper vertical window at least one set of: four adjacent apertures; a first aperture, a space, and three adjacent apertures; a first aperture, a first space, a second aperture, a second space, and a third aperture; four adjacent apertures; and two adjacent apertures, a space, and a single aperture: behind said right lower vertical window four adjacent apertures; a first aperture, a space, and three adjacent apertures; a first aperture; a space, and two adjacent apertures, a space, and a single aperture; and three adjacent apertures, a space, and a single aperture: behind said left upper vertical window a first aperture, a space, and a second aperture; three adjacent apertures; a first aperture, a double space, and a second aperture; two adjacent apertures, a space, and a single aperture; and three adjacent apertures: and behind said lower left vertical window a first aperture, a space, and two adjacent apertures; a first aperture, a first space, a second aperture, a second space, and a third aperture; two adjacent apertures, a space, and a single aperture; a first aperture, a double space, and a second aperture; and four adjacent apertures.

References Cited

UNITED STATES PATENTS

| | | | |
|---|---|---|---|
| 3,054,203 | 9/1962 | French. | |
| 3,110,893 | 11/1963 | Peacock | 340—324 |
| 3,153,227 | 10/1964 | Wales | 340—324 |

FOREIGN PATENTS

| | | |
|---|---|---|
| 370,728 | 4/1932 | Great Britain. |
| 414,407 | 5/1966 | Germany. |

JOHN W. CALDWELL, *Primary Examiner.*

A. KASPER, *Assistant Examiner.*